Jan. 2, 1951     O. W. OERMAN     2,536,459
DISK PLOW WHEEL

Original Filed Nov. 1, 1944     2 Sheets-Sheet 2

*INVENTOR.*
OREY W. OERMAN

ATTORNEYS

Patented Jan. 2, 1951

2,536,459

UNITED STATES PATENT OFFICE 2,536,459

DISK PLOW WHEEL

Orey W. Oerman, Moline, Ill., assignor to Deere & Company, Moline, Ill., a corporation of Illinois Original application November 1, 1944, Serial No. 561,432. Divided and this application December 29, 1945, Serial No. 638,023

4 Claims. (Cl. 301—41)

The present invention relates generally to agricultural implements and more particularly to implements in the nature of disk plows.

The object and general nature of the present invention is the provision of a new rear end construction for disk plows and similar implements especially adapted for simplicity and ease of construction and operation. More specifically, it is a feature of this invention also to provide a particular kind of rear furrow wheel so constructed and arranged as to have a longer life and to bite into the furrow bottom to a greater degree so as to utilize to best advantage the angular lead of the rear furrow wheel in operation so as to keep the rear end of the plow from swinging around landwardly out of the proper angular position.

These and other objects and advantages of the present invention will be apparent to those skilled in the art after a consideration of the following description, taken in conjunction with the accompanying drawings in which the preferred forms of the present invention have been illustrated.

Figure 1:
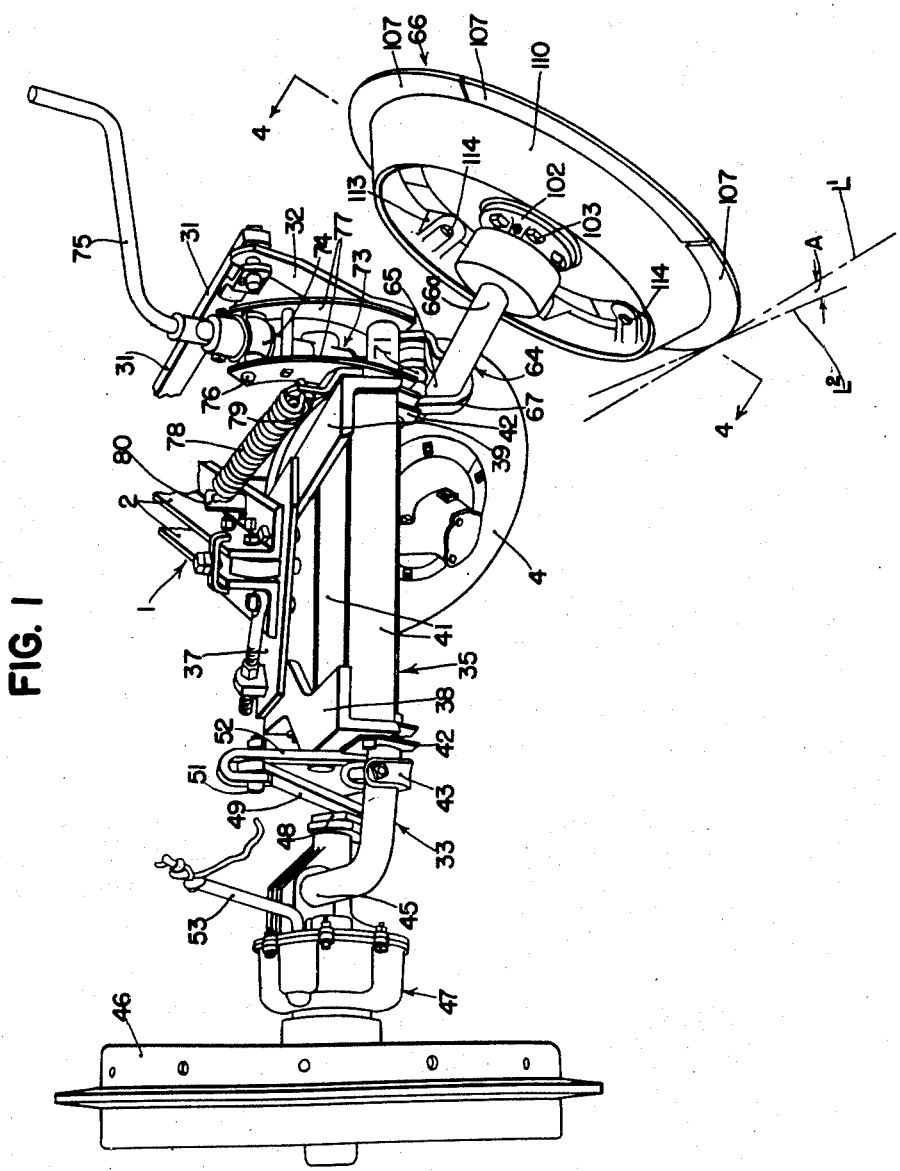
Figure 1 is a perspective view, taken from the rear, showing a disk plow in which the principles of the present invention have been incorporated.

This application is a division of my co-pending application, Serial No. 561,432, filed November 1, 1944, for Disk Plow, now U. S. Patent 2,512,962, issued June 27, 1950.

Referring now to the drawings, the reference numeral 1 indicates the frame of a disk plow in which the principles of the present invention have been illustrated. The frame 1 includes a pair of angles 2, connected together in back-to-back relation with a plurality of disk standards clamped therebetween, the lower ends of the disk standards having disks 4 rotatable thereon. The front end construction of the plow is shown in detail in the parent application identified above and hence further description of that portion of the plow is unnecessary here. It may be noted, however, that the front end construction comprises a front furrow wheel and suitable connections providing for the raising and the lowering of the front furrow wheel relative to the frame 1 and that the mechanism for raising and lowering the front end of the frame is connected with the rear end construction, to be described below in detail, by means of a generally longitudinally extending link member 31 which at its rear end is pivotally connected to the upper end of an arm 32 that is secured, as by welding, to the furrow-ward end of a land wheel crank axle 33. The latter is swingably connected with the rear end of the frame bars 2 by a rear frame section indicated in its entirety by the reference numeral 35 and which comprises a plate 37 adjustably bolted to the rear ends of the angles 2 and to which a pair of frame angles 38 and 39 are secured, as by welding. The rear portions of the angles 38 and 39 are connected by cross bars 41. Secured, as by bolts or the like, to the rear ends of the angles 38 and 39, are brackets 42 in which the crank axle 33 is swingably mounted. A collar 43 at one end and the arm 32 and associated parts at the other end of the crank axle 33, serve to hold the latter against lateral displacement with respect to the plow frame.

The crank axle 33 includes a forwardly extending section 45 which carries a land wheel 46 and a land wheel driven self-interrupting clutch unit 47. The latter unit includes a swingable arm 48 which is connected by a link 49 to a pivot bolt 51 carried by a bracket 52 that is fixed permanently, as by welding or the like, to the left rear frame angle 38. The clutch mechanism 47 is controlled by a trip lever 53, and whenever the latter is actuated the crank arm 48 is rotated by the rotation of the land wheel 46 through approximately a half revolution. Since the upper end of the link 48 is connected to the bracket 52 fixed to the frame, the swinging of the crank arm 48, as just mentioned, causes the crank axle 33 to swing, carrying with it the arm 32 which, through the longitudinally extending link 31, raises and lowers the front end of the frame relative to the front wheel spindle 9.

The front ends of the rear frame angles 38 and 39 are connected together by a cross bar, and adjacent the latter member are brackets 62 in which a furrow wheel crank axle 64 is swingably mounted. The crank axle 64 includes a rearwardly directed wheel receiving section 65 which terminates in a spindle part on which a furrow wheel 66 is mounted. A bracket 67 is clamped to the section 65 of the furrow wheel crank axle 64 and pivotally receives a screw-threaded member 71. Engaged with the latter member is a rotatable sleeve 73 carried in a trunnion member 74 and actuated by an adjusting crank 75. The trunnion 74 is pivoted, as at 76, to the upper ends of a pair of arms 77 which are fixed to the furrowward end of the land wheel crank axle 33, preferably adjacent, or actually secured, as by welding, to the arm 32. Thus, the arms 77, being secured together, and also to the arm 32, constitute with the latter a single swingable member operated by the swinging movement of the land wheel crank axle 33. An assisting spring 78 is anchored at its rear end to a lug 79 welded to the inside arm 77 and at its forward end is connected to a lug 80 bolted to one of the main frame angles to aid in raising the plow.

It will be noted that through the link 49 and the self-interrupting clutch unit 47, the crank axle 33 is adapted to be swung between two predetermined positions relative to the frame, there being no adjustment for either of these positions and, as more clearly disclosed in the above-identified parent application, by virtue of this predetermined amount of swinging of the land wheel crank axle 33, both the front furrow wheels (not shown) and the rear wheel 66 may be raised and lowered by power derived from the forward traction of the outfit. Since the land wheel 46 is disposed well to one side of the disks 4 and the front and rear furrow wheels are disposed practically in line with the disks 4, it will be seen that the raising and lowering of the frame relative to the furrow wheels raises and lowers the disks between their operating and transport positions. The position of the rear furrow wheel relative to the other wheels, and also relative to one of the predetermined positions of the land wheel crank axle 33, may be adjusted by turning the crank 75 in one direction or the other. For example, when the farmer desires to plow somewhat deeper, he turns the crank screw 75 in a direction to raise the rear furrow wheel 66 slightly above the level of the disks, thus adding more weight to the rear of the frame and causing the disks to penetrate to a greater degree. Also, the raising of the rear furrow wheel 66 also increases the depth of plowing since, in any given position, the wheel 66 limits the downward movement of the plow.

Referring now particularly to Figure 1, it will be observed that the wheel receiving section 66a of the rear furrow wheel crank axle 64 is so angled that when the parts are in their operating position the plane of the wheel intersects the ground along the line that angles outwardly with respect to the direction of forward advance. This angle is referred to as an angle of lead, since the function of disposing the rear furrow wheel in this manner, leading off to the furrowward side of the plow, is to offset the tendency for the rear end of the plow to swing around to the left and forward, due to the curvature of the disks. The angle of lead which is built into the plow is such as to positively hold the rear end of the plow against such lateral displacement, and according to the present invention this is done not only by providing the amount of lead above referred to, but also by providing a special wheel construction which forms the subject matter of this divisional application and in which the radial flange of the wheel is so constructed and arranged as to bite into the soil with a positive action, thus making the above-mentioned lead actually effective for the purpose for which it is used. Further, the section 66a of the crank axle 64 is so shaped that when the plow is raised the amount of lead is reduced to zero, in addition, the rear furrow wheel 66 is swung forwardly while the land wheel 46 is swung rearwardly, the parts being so constructed that when the plow is in its transport position the wheels 46 and 66 are substantially opposite one another. Since now the lines along which the planes of the rear land and furrow wheels intersect the ground are parallel to each other and to the line of forward advance, the plow trails for transport without tending to swing to one side or the other. The line of intersection between the plane of the wheel 66 and the ground when the plow is in transport position is indicated in Figure 1 by the reference numeral $L^1$ and the line of intersection between the plane of the rear furrow wheel 66 and the ground when the plow is in operating position is indicated by the reference numeral $L^2$. Also indicated in this figure is the angle of lead A.

As mentioned above, in order to make the lead A effective when in operation, it is necessary that the rear furrow wheel 66 be provided with a flange that actually cuts into the furrow bottom a distance sufficient to give the wheel a purchase on the ground so as to hold the rear end of the disk from swinging around to the left and forwardly. The preferred wheel construction for this purpose will now be described.

Referring first to Figure 1, the wheel receiving section 66a of the rear furrow wheel crank axle 64 is apertured, as at 81, to receive a pin 82 which holds a long bearing sleeve 83 in position. The bearing sleeve 83 is hardened and is provided with a radially outwardly extending flange 84. The wheel hub is indicated in its entirety by the reference numeral 86 and comprises a cap section 87 and an internal sleeve section 88. The cap section 87 has a shouldered portion 89 which bears against one side of the radial flange 84, preferably through thrust collars or similar bearing members 91. Likewise, the wheel hub section 88 has a shouldered section 92 which bears against the other side of the flange 84, preferably through thrust washers 93 or other suitable means.

The main body or web of the wheel is indicated by the reference numeral 96 and comprises a central section 97 and an outer peripheral section 98. The center section 97 is adapted to be disposed between the wheel hub sections 87 and 88, for which purpose these members are provided with flanges 101 and 102 which are apertured to receive clamping bolts 103 that pass not only through the flanges 101 and 102 but also the central portion of the wheel body 96.

Figure 2:
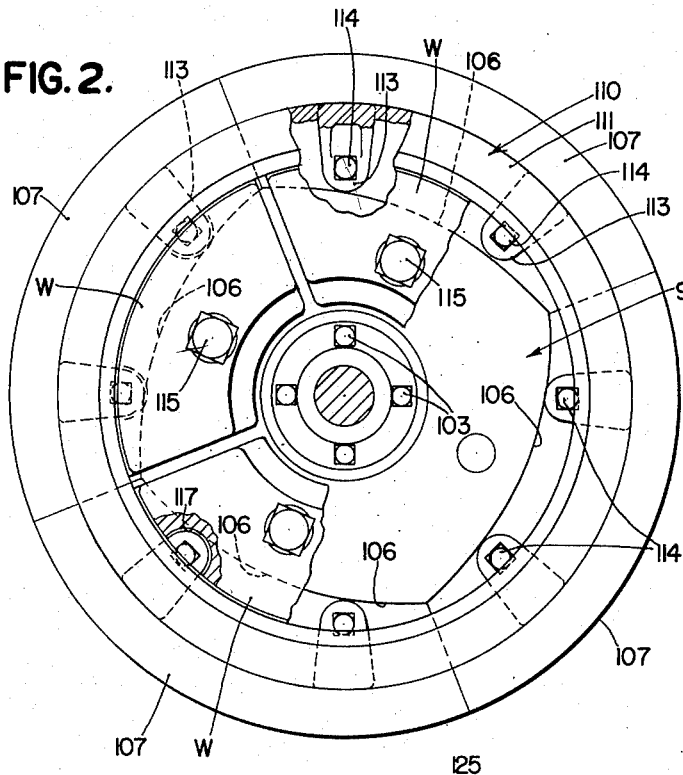
Figure 2 is a side view of the rear wheel shown in Figure 1, certain parts being broken away the better to show the wheel construction.
Figure 4:
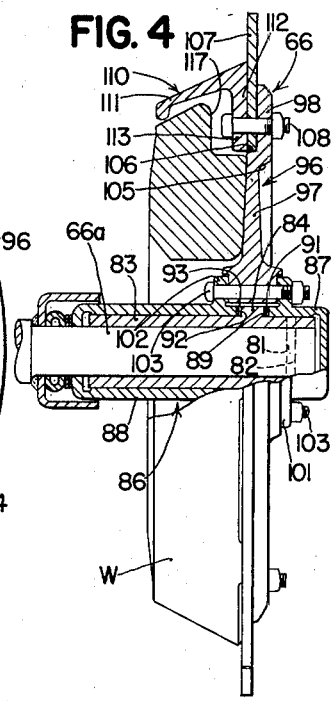
Figure 4 is a sectional view taken along the line 4—4 of Figure 1.

The peripheral section 98 of the wheel body 96 is laterally offset, as at 105, and is provided with a plurality, such as four, plate-receiving sections 106 which are arcuate when viewed from inside the wheel. The corresponding number of segmental planar plates 107 are seated in the notches 106. These plate sections, when fitted in the seats 106, form a complete circle and extend for a considerable distance radially beyond the peripheral portions 105 of the wheel body. The plates 107 are apertured, as are the peripheral portions 98 of the wheel body. The wheel 66 is completed by a plate-clamping conical rim section 110. This member includes a conical tread 111 and a radially inwardly extending flange 112 which is formed with a plurality of apertured inwardly extending lugs 113. Bolts 114 are passed through the openings in the lugs 113, the plates 107 and the peripheral portion 98 of the wheel body, so that, when the bolts are tightened, the segmental plates are clamped rigidly and firmly between the conical rim member 110 and the offset sections 105 of the wheel body. The segmental plates extend radially outwardly and, as best shown in Figure 2, are adapted to bite into the bottom of the furrow with sufficient purchase to permit the wheel 66 to perform its desired function as provided by the angle of lead A. Heretofore, the rear furrow wheels for disk plows and the like have been made as a single casting, and when the edge or rim of the wheel became rounded to such an extent that it could no longer secure sufficient purchase to be effective, it was necessary for the farmer to discard the wheel and purchase a new one. According to the principles of the present invention, however, all that the farmer has to do in the present instance is to renew the plates 107. These plates may readily be formed of flat stock and may have the required toughness and strength to outlast many times the ordinary cast wheel. It is, of course, a relatively simple matter to remove the bolts 114 and substitute new plates 107 between the conical wheel rim 110 and the flanged portion 98 of the wheel body 96. If wheel weights have been applied to the wheel, it is, of course, necessary to remove the wheel weights before replacing the plates 107. In Figures 2 and 4 the wheel weights are indicated by the reference character W and may be secured to the web portion 96 of the wheel in any suitable manner, as by bolts 115 or any other suitable means. In Figure 2, portions of the wheel weights have been broken away in order to better show the wheel construction with which the present invention is more particularly concerned. In order to accommodate the lugs 113, the wheel weights W may have recesses 117, as best shown in Figures 2 and 4. As best shown in Figure 2, the lugs 113 are offset slightly away from the inside plane of the conical wheel rim 10 so as to provide for localized areas of contact, thus accommodating a certain amount of irregularity in the shape of the wheel body 96 and/or the plate 107.

Figure 3:
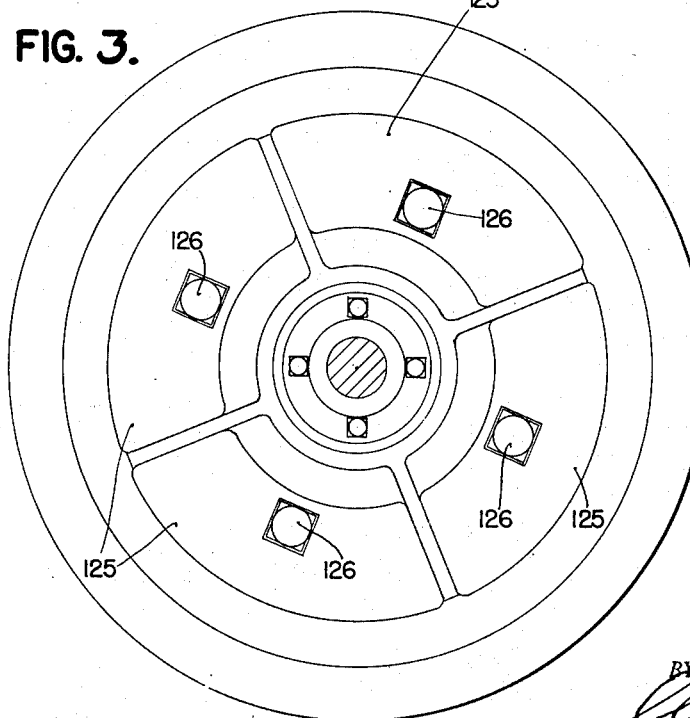
Figure 3 is a modified form of wheel construction.
Figure 5:
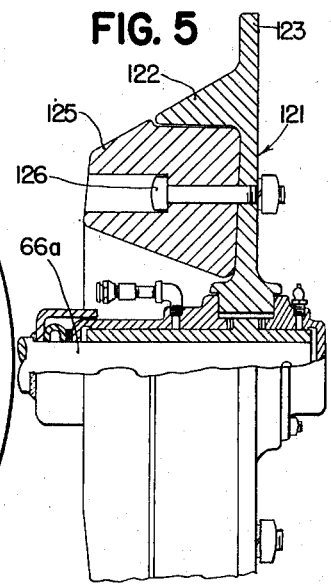
Figure 5 is a sectional view of the wheel shown in Figure 3, being a section corresponding generally to the sectional view shown in Figure 4.

A modified form of wheel is shown in Figures 3 and 5 in which the wheel body 121, the conical rim section 122 and the earth penetrating wheel flange 123 are formed as one integral part. Under suitable soil and operating conditions, a wheel of this type is satisfactory. It will be noted, however, that both wheels have in common the features of a planar flange section of considerable extent at one side of a conical rim section. While in Figure 4 the planar rim section may be replaced, in Figure 3 the planar section cannot be replaced. However, where conditions are not too severe, the extent of the planar wheel flange sections 123 is sufficient to last the life of the plow. Wheel weights 125 may be bolted, as at 126, to the wheel body 121 in much the same manner as the wheel weights are attached in the form of the invention shown in Figure 4.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A furrow wheel for a plow or the like comprising a web section having an annular shoulder and apertured portions radially outwardly of said shoulder, a plurality of segmental plates disposed against said shoulders and extending in overlapping relation with and radially beyond said apertured portions, said segmental plates having apertures registering with said web apertures, a wheel flange section connected to said web section with said segmental plates therebetween and having apertured portions, the apertures of which register with said web apertures, and securing means extending through all of said apertures for fastening said wheel flange section, said plates and said web section together.

2. The invention set forth in claim 1, further characterized by said wheel flange including radially inwardly extending apertured lugs, and means extending through said lugs and portions of said wheel web and segmental plates for clamping the latter in between the wheel flange and the wheel web.

3. In a furrow wheel for a plow or the like, a wheel web member having a peripheral section formed with a plurality of circumferentially spaced plate-receiving sockets, all at one side of said web member, a plurality of planar segmental plates seating in said sockets, a clamping ring member disposed against the sides of said segmental plates in said sockets opposite said web member, and means extending through said ring member, segmental plates and web member for clamping said ring to said wheel web with said segmental plates clamped therebetween.

4. The invention set forth in claim 3, further characterized by said ring member having a circumferential section lying in a radially inwardly tapering conical surface and serving as at least a part of the tread of the wheel, said clamping ring member having a plurality of lugs extending radially inwardly beyond the outer edge of said conical tread section and receiving said clamping means in a position to facilitate access thereto inwardly of the edge of said tread section.

OREY W. OERMAN.

REFERENCES CITED

The following references are of record in the file of this patent:

UNITED STATES PATENTS

| Number | Name | Date |
|---|---|---|
| 764,593 | Johnston | July 12, 1904 |
| 1,380,462 | Berry | June 7, 1921 |
| 1,456,818 | Morton | May 29, 1923 |
| 1,525,439 | Campbell | Feb. 10, 1925 |
| 2,330,085 | Shaw | Sept. 21, 1943 |
| 2,366,280 | Moroski | Jan. 2, 1945 |